US009940749B2

(12) United States Patent
Chen et al.

(10) Patent No.: US 9,940,749 B2
(45) Date of Patent: Apr. 10, 2018

(54) METHOD AND SYSTEM FOR GENERATING THREE-DIMENSIONAL GARMENT MODEL

(71) Applicant: BEIHANG UNIVERSITY, Beijing (CN)

(72) Inventors: Xiaowu Chen, Beijing (CN); Bin Zhou, Beijing (CN); Qinping Zhao, Beijing (CN); Feixiang Lu, Beijing (CN); Lin Wang, Beijing (CN); Lang Bi, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 163 days.

(21) Appl. No.: 15/062,926

(22) Filed: Mar. 7, 2016

(65) Prior Publication Data
US 2017/0018117 A1  Jan. 19, 2017

(30) Foreign Application Priority Data
Jul. 13, 2015 (CN) .......................... 2015 1 0409528

(51) Int. Cl.
*G06T 17/20* (2006.01)
*G06K 9/62* (2006.01)
(Continued)

(52) U.S. Cl.
CPC ........ *G06T 17/205* (2013.01); *G06K 9/00362* (2013.01); *G06K 9/00369* (2013.01);
(Continued)

(58) Field of Classification Search
None
See application file for complete search history.

(56) References Cited

U.S. PATENT DOCUMENTS

| 2004/0227752 A1 | 11/2004 | McCartha et al. ............. 345/419 |
| 2016/0098592 A1* | 4/2016 | Lee ........................ G06F 19/321 434/236 |

(Continued)

FOREIGN PATENT DOCUMENTS

| CN | 102982578 A | 3/2013 |
| CN | 103473806 A | 12/2013 |
| CN | 103955963 A | 7/2014 |

OTHER PUBLICATIONS

Zhou, Bin, et al. "Garment modeling from a single image." Computer graphics forum. vol. 32. No. 7. 2013.*

(Continued)

*Primary Examiner* — Yu Chen
(74) *Attorney, Agent, or Firm* — J.C. Patents

(57) ABSTRACT

The present invention provides a method and a system for generating a three-dimensional garment model, where garment component composition information and attribute information corresponding to each garment component are acquired by acquiring and processing RGBD data of a dressed human body, and then a three-dimensional garment component model corresponding to the attribute information of each garment component is selected in a three-dimensional garment component model library, that is, a three-dimensional garment model can be constructed rapidly and automatically only with RGBD data of a dressed human body, and human interactions are not necessary during the process of construction, thus the efficiency of a three-dimensional garment modeling is improved, and it has significant meaning for the development of computer-aided design, three-dimensional garment modeling and virtual garment fitting technology.

5 Claims, 7 Drawing Sheets

(51) Int. Cl.
    *G06K 9/00*     (2006.01)
    *G06T 19/20*    (2011.01)
    *G06K 9/46*     (2006.01)

(52) U.S. Cl.
    CPC ......... *G06K 9/4652* (2013.01); *G06K 9/6278*
             (2013.01); *G06K 9/6296* (2013.01); *G06T*
             *19/20* (2013.01); *G06K 9/6256* (2013.01);
             *G06T 2210/16* (2013.01); *G06T 2219/2008*
                                                  (2013.01)

(56) References Cited

U.S. PATENT DOCUMENTS

2016/0110595 A1* 4/2016 Wang ................ G06K 9/00375
                                                       705/27.2
2016/0247017 A1* 8/2016 Sareen .................... G06T 19/00
2016/0350336 A1* 12/2016 Checka ............. G06F 17/30268

OTHER PUBLICATIONS

Lu, Yan, "Garment Display technology based on three-dimensional virtual scanning model" Beijing Institute of Fashion Technology graduate research paper; Dec. 15, 2014.

Zhou, Bin et al., "Garment Modeling from a Single Image" Computer Graphic Forum; vol. 32, Issue 7; Oct. 2007; pp. 85-91.

Zhu, Zi-Yang et al., "Mannequin Modeling for 3D dress Based on Part Separation" Computer Engineering; vol. 35, No. 2; Jan. 2009; pp. 271-273

The Chinese First Examination Report of corresponding Chinese patent application No. 201510409528.9, dated May 4, 2017.

* cited by examiner

“METHOD AND SYSTEM FOR GENERATING THREE-DIMENSIONAL GARMENT MODEL

CROSS-REFERENCE TO RELATED APPLICATIONS

This application claims priority to Chinese Patent Application No. 201510409528.9, filed on Jul. 13, 2015, the content of which is hereby incorporated by reference in its entirety.

TECHNICAL FIELD

The present invention relates to three-dimensional modeling technique, and particularly to a method and a system for generating a three-dimensional garment model, which belongs to the technical field of computer-aided design.

BACKGROUND

People's working efficiencies and lifestyles have been changed significantly due to a wide application of computer-aided design and virtual reality technology. During industrial design and manufacture, it has become an object to be sought to improve the quality of products, reduce the waste of raw materials, and shorten the manufacturing period. With the rise of the Internet technology, an on-line consumption pattern is gradually replacing an off-line consumption pattern, people are no longer willing to go personally to the mall for shopping, which is laborious and time consuming, but prefer to use a rapid and convenient on-line shopping manner. However, purchasing garment online will confront undesirable situations such as improper size, uncoordinated color or the like, which greatly reduces practicability of garment purchasing through the Internet.

In the garment industrial field, a virtual fitting system is adopted so that a customer can browse fitting effects of different garments in a shortest time, and meanwhile a garment designer can accumulate more source materials for fitting effects and shorten design period. The virtual fitting system is getting more and more popular, the traditional fitting pattern is reformed, and therefore, the garment purchasing is not only easy and convenient, but also interesting, and meanwhile selling and purchasing costs are saved. Currently, an image-based virtual fitting technology only provides two-dimensional data of the garment, and fails to meet actual demands of the virtual fitting, and user experience is poor. The virtual fitting technology based on three-dimensional data can actually reproduce the whole fitting process, and the user can view the fitting effect of the garment in all perspectives, which provides a high confidence level, but this technology faces difficulties in four aspects: 1) accurate and rapid construction of the three-dimensional garment model; 2) exact acquisition of user's body figure data; 3) efficient and vivid simulation of cloth materials; 4) image-level rendering of cloth materials.

The popularization of a depth camera provides a certain convenience to acquire the user's body figure data, simulation of cloth materials and rendering technique are also popularized widely in a large scale. However, the basic link for the three-dimensional virtual garment fitting, i.e., the construction of the three-dimensional garment model is relatively immature, which becomes a bottleneck of deploying the virtual garment fitting in a large scale. The existing three-dimensional garment model is mainly generated by a three-dimensional modeling software like Maya or a garment simulation software like Marvelous, however, mass human interactions are needed during application of such modeling software, and the interaction participant is asked to possess knowledge in the garment designing field, and therefore, the existing three-dimensional garment model has a poor generation efficiency.

SUMMARY

The present invention provides a method and a system for generating a three-dimensional garment model, and a three-dimensional garment model can be constructed rapidly and automatically by scanning a three-channel color image and depth (Red Green Blue and Depth, RGBD) data with a depth camera.

According to the embodiments of the present invention, the method for generating a three-dimensional garment model includes: acquiring RGBD data of a dressed human body; acquiring garment component composition information according to the RGBD data of the dressed human body; acquiring attribute information of each garment component based on the garment component composition information; selecting a three-dimensional component model corresponding to the attribute information of each garment component in a three-dimensional garment component model library; and generating a three-dimensional garment model by assembling the three-dimensional garment component model.

According to the embodiments of the present invention, the system for generating a three-dimensional garment model includes: a system back-end and a system front-end, the system back-end includes a three-dimensional garment component model library, the system front-end includes a data acquiring unit, a garment component information parsing unit, a three-dimensional garment component model retrieving unit and a three-dimensional garment model generating unit. The data acquiring unit is configured to acquire RGBD data of a dressed human body. The garment component information parsing unit includes a garment component detector and a garment component attribute classifier. The garment component detector is configured to acquire garment component composition information according to the RGBD data of the dressed human body; the garment component attribute classifier is configured to acquire attribute information of each garment component based on the garment component composition information. The three-dimensional garment component model retrieving unit is configured to retrieve a three-dimensional garment component model corresponding to the attribute information of each garment component in a three-dimensional garment component model library. The three-dimensional garment model generating unit is configured to generate a three-dimensional garment model by assembling the three-dimensional garment component model.

The embodiments of the present invention provide a method and a system for generating a three-dimensional garment model, where garment component composition information and attribute information corresponding to each garment component are acquired by acquiring and processing RGBD data of a dressed human body, and then a three-dimensional garment component model corresponding to the attribute information of each garment component is selected in a three-dimensional garment component model library, that is, a three-dimensional garment model can be constructed rapidly and automatically only by scanning RGBD data of a dressed human body. The three-dimensional garment component model is provided based on garment component composition information in the three-dimensional garment component model library provided by the system for generating the three-dimensional garment model, so that the three-dimensional garment model can be generated in an automatic way, and human interactions are not necessary during the process of generation, thus the efficiency of a three-dimensional garment modeling is improved, and it has significant meaning for the development of computer-aided design, three-dimensional garment modeling and virtual garment fitting technology.

BRIEF DESCRIPTION OF DRAWINGS

In order to illustrate the technical solutions in embodiments of the present invention or the prior art more clearly, accompanying drawings needed in the embodiments or the prior art are illustrated briefly as follows. Apparently, the accompanying drawings are merely certain embodiments of the invention, and persons skilled in the art can derive other drawings from them without creative efforts.

DESCRIPTION OF EMBODIMENTS

The technical solutions in embodiments of the present invention are hereinafter described clearly and completely with reference to the accompanying drawings in the embodiments of the present invention. Obviously, the embodiments described here are part of the embodiments of the invention but not all of the embodiments. All other embodiments, which can be derived by persons skilled in the art from the embodiments given herein without creative efforts, shall fall within the protection scope of the present invention.

Figure 1:
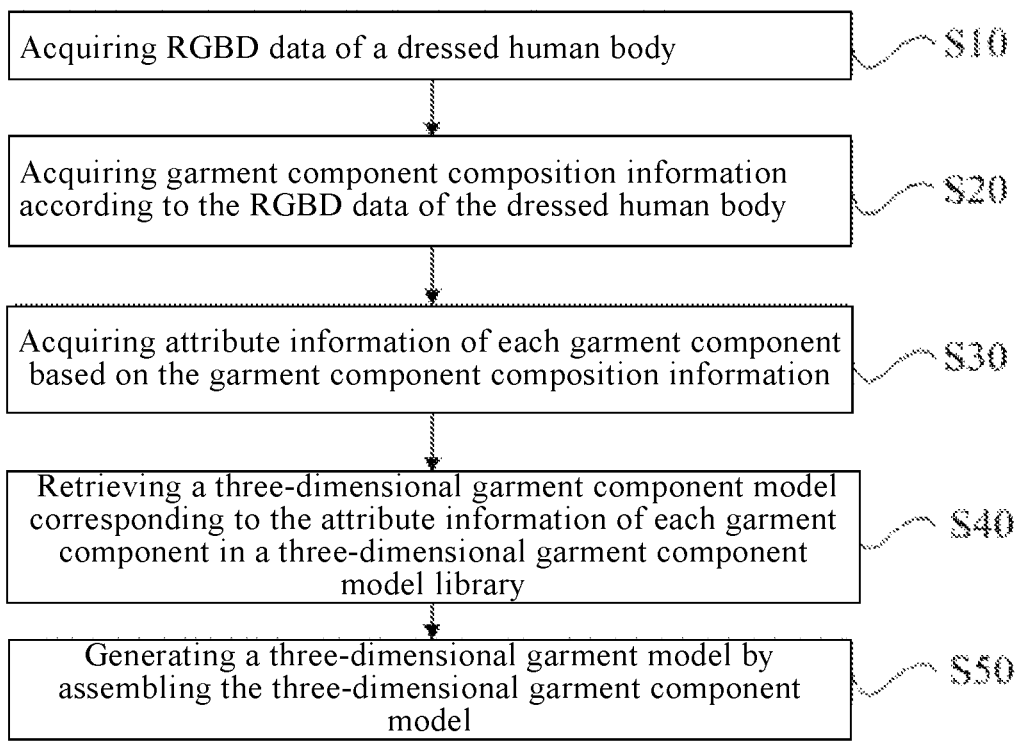
FIG. 1 is a flow chart of a method for generating a three-dimensional garment model according to an embodiment of the present invention.

FIG. 1 is a flow chart of a method for generating a three-dimensional garment model according to an embodiment of the present invention, as shown in FIG. 1, the method for generating a three-dimensional garment model according to this embodiment includes steps as follows:

S10, Acquiring RGBD data of a dressed human body;

S20, Acquiring garment component composition information according to the RGBD data of the dressed human body;

S30, Acquiring attribute information of each garment component based on the garment component composition information;

S40, Retrieving a three-dimensional garment component model corresponding to the attribute information of each garment component in a three-dimensional garment component model library; and S50, Generating a three-dimensional garment model by assembling the three-dimensional garment component model.

The technical solution in this embodiment can be achieved in a system for generating a three-dimensional garment model, the system can include a three-dimensional garment component model library for supporting the implementation of the method for generating a three-dimensional garment model in this embodiment, and the three-dimensional garment component model library stores massive three-dimensional garment component models. Illustratively, the three-dimensional garment component model library can be acquired in the following method:

Firstly, before constructing the three-dimensional garment component model library of the garment component, the garment component composition information and the attribute information of each garment component used in the whole system are unified, for example, a universal garment information expression tree for the whole system can be constructed. The garment information expression tree is a database for describing garment component composition information and attribute information of each garment component. Particularly, the garment information expression tree can contain three layers of nodes, and each node has a corresponding state value. The first layer includes nodes of garment component composition information, that is, names of components for constituting the garment, including: collar, sleeves, bodice, skirt, trousers, pocket, waistband, bow tie and button. The second layer includes nodes of attribute information of each garment component, which are used to describe features of the garment component, for example, attributes of sleeves include: sleeve length, cuff, armhole, tightness etc. The third layer node includes nodes of state values corresponding to each attribute, for example, the state values for the armhole include: straight armhole, batwing armhole, bubble armhole etc.

Figure 2:
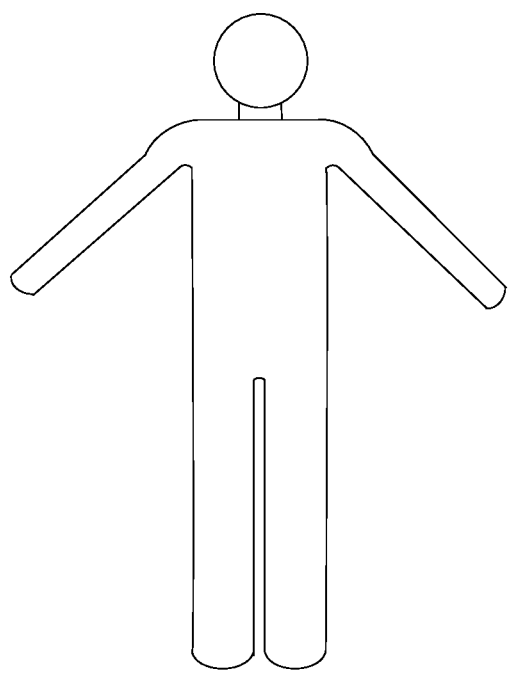
FIG. 2 is a schematic diagram of a standard virtual mannequin.

Thereafter, according to each group of state values in the garment information expression tree, collect a large amount of electronic sample data of real 2D (Two Dimensions) garment sewing, that is, the electronic sample data of real 2D garment sewing used by garment manufacturers when manufacturing practical garment, then convert 2D sample data into 3D (Three Dimensions) model data using Marvelous virtual garment designing software, all the data conversion is performed on a standard virtual mannequin, and FIG. 2 is a schematic diagram of the standard virtual mannequin. The three-dimensional data for each garment component is derived individually, and saved as data in a standard 3D model file format (also called an OBJ format). Expression information corresponding to the garment information expression tree is added for the derived three-dimensional garment component. Finally, each group of state values in the garment information expression tree corresponds to 3 to 5 three-dimensional component models. In this way, after the attribute information of the garment component is given, corresponding three-dimensional garment component model can be retrieved in the three-dimensional garment component model library, so as to support the generation of a three-dimensional garment model.

Specific implementation for each step of the method for generating the three-dimensional garment model is further described by way of example in this embodiment, and these examples are only for further illustration and not intended to limit the present invention.

Illustratively, RGBD data of human skeleton and garment are acquired by scanning a dressed human body using a depth camera (S10). RGBD data essentially contains two images, one is an ordinary RGB image, and the other is a depth image, the depth image is similar to a gray image, the difference thereof is that each pixel value of the depth image is the actual distance between a sensor and an object. The RGB image and the depth image are generally registered, and thus there is an one-to-one correspondence between pixel points. For example, Kinect, which is developed by the Microsoft Corporation, can be adopted, because this depth camera is cost effective, not only satisfying performance requirements, but also effectively saving costs due to its low price.

Illustratively, a garment image library also can be constructed before constructing the three-dimensional garment model, and stored in the back-end of the system. Mass garment images are stored in the garment image library; each garment image can be labeled with a pixel area corresponding to a garment component, and labeled with garment component composition information according to the garment information expression tree. Therefore, each garment image in the garment image library will correspond to one group of state values in the garment information expression tree. That is, the garment image in the garment image library has a garment component pixel area identifier and a corresponding component composition information identifier. Illustratively, in order to achieve a rapid and convenient management of garment image data, a garment image management tool can be used to implement basic functions, such as bulk loading, display, interactive labeling and modification, and category retrieval and derivation of garment images. Further, a garment component detector is trained using the garment image library in the system for generating a three-dimensional garment model by a machine learning method, for acquiring garment component composition information according to the RGBD data of the dressed human body (S20). The garment component detector can automatically judge the existence of each component in the garment image and a specific location in the image.

Preferably, the number of the garment component detectors can be two: 1) a garment major component detector based on the human skeleton. Major components of the garment include components with a large area, such as sleeves, bodice, skirt, trousers etc, such components have a relatively fixed distribution position with respect to the human body, for example, sleeves always cover arms of human body. The human skeleton can be used to accurately position the areas where such components are located in the image. 2) a garment accessory component detector based on priori knowledge on garment designing. The garment accessory component includes components with a small area, such as pocket, waistband, bow tie, collar, and button etc, such components have a relatively random distribution position with respect to the human body, and cannot be accurately located through the human skeleton. As an optional embodiment of this embodiment, a detecting method with a deformable template can be adopted, first detect such garment component in the image, and then optimize the detection result with priori information of the component distributed on the garment, so as to achieve garment component detection with random locations. The so-called deformable template is to deform the template pattern (not limited to simple geometric deformation, such as shifting, rotation and scale transformation), so as to match significant features of the image.

To sum up, as a preferred embodiment of this embodiment, step S20 can specifically include two steps as follows:

Step 1, Determining a pixel area of each garment component according to the RGBD data of a dressed human body;

Step 2, Acquiring component composition information corresponding to the pixel area in the garment image library, according to the pixel area of each garment component.

Illustratively, a garment component attribute classifier is trained using the garment image library in the system for generating a three-dimensional garment model by a machine learning method, for acquiring attribute information of each garment component (S30).

Illustratively, a garment image in the garment image library further includes a histogram of oriented gradient (Histogram of Oriented Gradient, HOG) feature and a local binary pattern (local binary pattern, LBP) feature labeled in a pixel area of a garment component and an attribute information identifier of the corresponding component. It will be appreciated that, the attribute information identifier is also added according to the garment information expression tree. When training the garment component attribute classifier, first, cutting a labeled pixel area corresponding to the component to obtain an image area block where the component is located, and normalizing and aligning the image area block to scale all the image area blocks into 200*200 pixels. With regard to attribute information of each garment component, first, calculating an HOG feature and an LBP feature in an image area block of the corresponding component, and then connecting the two features in series to constitute an low level feature representation for the image area block of the component. The low level features for the image area block of the same component form a feature sample set, then performing dimension reduction on the feature sample set using a principal components analysis (Principal Components Analysis, PCA) method, to keep 80% principal components and obtain the final feature sample set. In this way, each feature sample corresponds to attribute information of one component, and a component attribute classifier is trained and learned by taking the feature sample set and the attribute information of corresponding component as input of random forest.

To sum up, as a preferred embodiment of this embodiment, step S30 can specifically include two steps as follows:

Step 1, Extracting an HOG feature and an LBP feature in the pixel area of each garment component;

Step 2, Acquiring attribute information of corresponding component in the garment image library, according to the HOG feature and the LBP feature in the pixel area of each garment component.

Illustratively, a three-dimensional garment component model retrieving tool can be designed according to the three-dimensional garment component model library in the system for generating the three-dimensional garment model, for retrieving a three-dimensional garment component model corresponding to the attribute information of each garment component in the three-dimensional garment component model library (S40). Since three-dimensional component models in the three-dimensional garment component model library are all added with expression information corresponding to the garment information expression tree, that is, each group of state values in the garment information expression tree corresponds to 3 to 5 corresponding three-dimensional component models, and therefore, after the attribute information of the garment component is given, corresponding three-dimensional garment component model can be retrieved in the three-dimensional garment component model library.

Illustratively, when generating a three-dimensional garment model by assembling the three-dimensional garment component model (S50), meshes at stitching lines between three-dimensional component models are re-meshed through predefined stitching point pairs between three-dimensional component models, and the three-dimensional garment component models are automatically spliced using a component shape-preserving stitching method, to obtain the three-dimensional garment model.

In the method for generating a three-dimensional garment model provided in this embodiment, garment component composition information and attribute information corresponding to each component are acquired after processing RGBD data of a dressed human body scanned by a depth camera, and then a three-dimensional garment component model corresponding to the attribute information of each garment component is selected in a three-dimensional garment component model library, that is, a three-dimensional garment model can be constructed rapidly and automatically only by using RGBD data of a dressed human body scanned by a depth camera. Therefore, the three-dimensional garment model can be generated in an automatic way, and human interactions are not necessary during the process of generation, thus the three-dimensional garment modeling efficiency is improved, and it has significant meaning for the development of computer-aided design, three-dimensional garment modeling and virtual garment fitting technology.

In addition, most of the existing techniques for acquiring a three-dimension model need to collaborate a multi-view acquiring environment, which only can be done in a professionally-equipped laboratory, however, in the method for generating a three-dimensional garment model provided in this embodiment, it is only necessary to extract garment component composition information and attribute information corresponding to each component from RGBD data of a dressed human body, and thus one depth camera to perform a single-view scanning is enough, which can effectively save modeling cost and is easy to operate.

Figure 3:
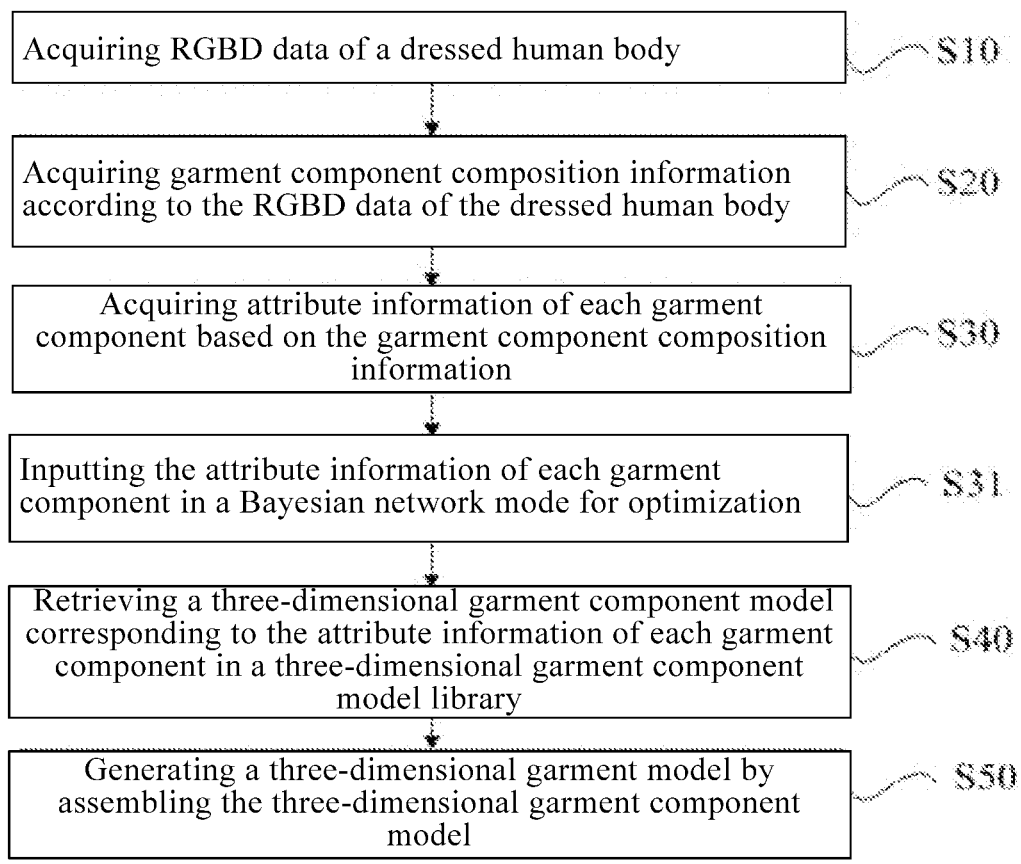
FIG. 3 is a flow chart of another method for generating a three-dimensional garment model according to an embodiment of the present invention.
Figure 4:
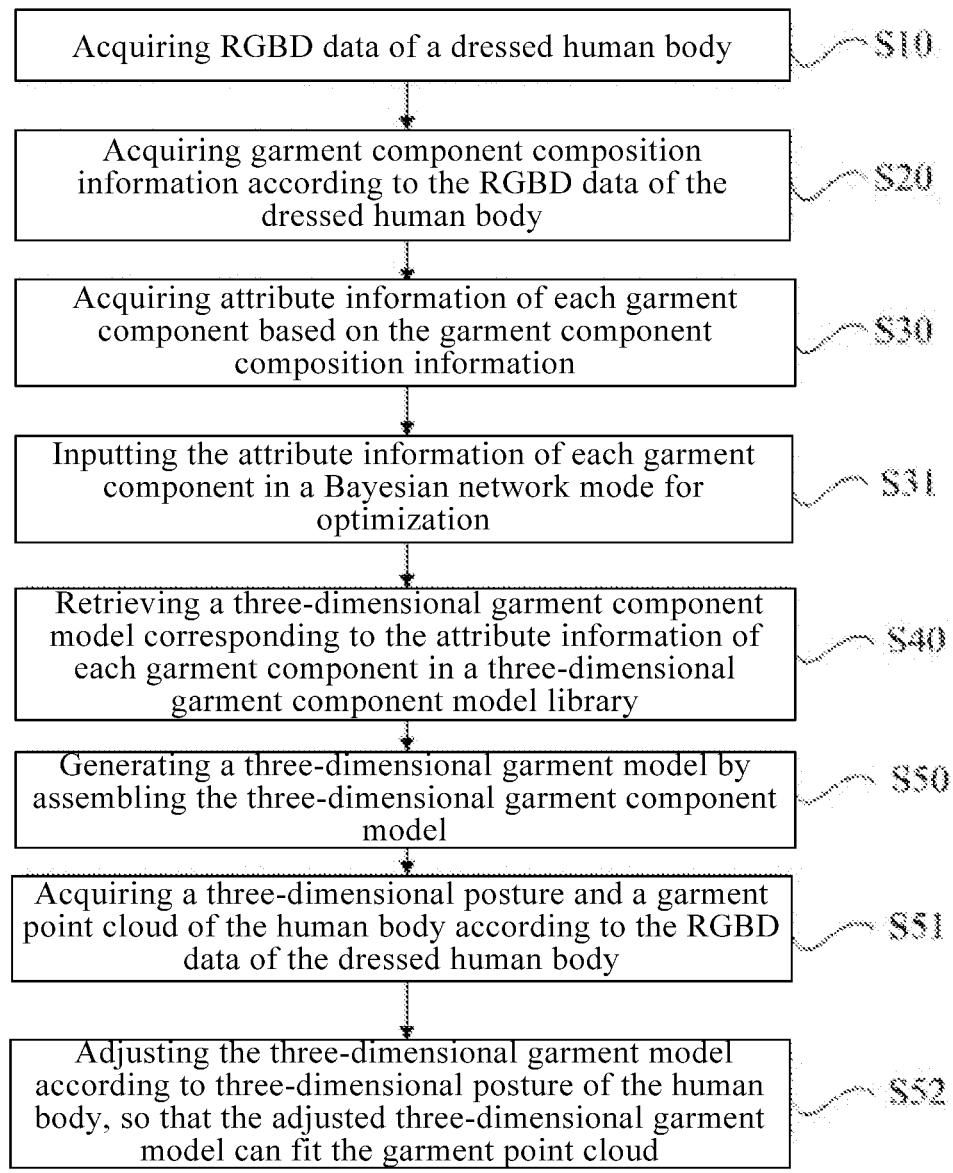
FIG. 4 is a flow chart of still another method for generating a three-dimensional garment model according to an embodiment of the present invention.

To make the finally-generated three-dimensional garment model more accurate, embodiments of the present invention also provide a method for generating a three-dimensional garment model as shown in FIG. 3 and FIG. 4. FIG. 3 is a flow chart of another method for generating a three-dimensional garment model according to an embodiment of the present invention, on the basis of the embodiments shown in FIG. 1, after S30, the method in this embodiment can also include:

S31, Inputting the attribute information of each garment component in a Bayesian network mode for optimization.

It will be appreciated that the Bayesian network is applicable to expressing and analyzing uncertain and probabilistic events, and is applied to decisions conditionally depending on a variety of controlling factors, capable of making inferences from incomplete, inaccurate or uncertain knowledge or information, and has a strong uncertain problem processing capacity. The Bayesian network expresses correlation between information elements with a conditional probability, and is able to learn and infer under limited, incomplete and uncertain information conditions.

Therefore, the Bayesian network can be obtained by training collocation constraint of each garment component. Illustratively, according to the garment information expression tree, each group of state values in the garment information expression tree are corresponding to a garment design sample in real life, a structure and a parameter of a Bayesian network model are obtained by learning from real garment design sample data using a supervised training method, for example, a Bayesian network model can be constructed based on a genetic algorithm, for describing collocation constraint of each garment component.

As an optional embodiment, the Bayesian network for describing collocation constraint of each garment component can be obtained using a garment image library at the back-end of the system. After inputting the attribute information of each garment component obtained in S30 in a Bayesian network model, the attribute information of each garment component can be further optimized using a genetic algorithm, to obtain optimal garment component composition information and attribute information of the component.

FIG. 4 is a flow chart of still another method for generating a three-dimensional garment model according to an embodiment of the present invention, on the basis of the embodiments shown in FIG. 3, after S50, the method in this embodiment can also include:

S51, Acquiring a three-dimensional posture and a garment point cloud of the human body according to the RGBD data of the dressed human body;

S52, Adjusting the three-dimensional garment model according to three-dimensional posture of the human body, so that the adjusted three-dimensional garment model can fit the garment point cloud.

Illustratively, Kinect, developed by the Microsoft Corporation, is preferably adopted in the embodiments of the present invention, to acquire RGBD data of the dressed human body, since RGB camera and 3D depth camera of Kinect are independent from each other, and a registered application programming interface (Application Programming Interface, API) provided by Kinect software development kit (Software Development Kit, SDK) can register the acquired RGBD series data of the dressed human body, then binary images in a human body area and a garment area of RGBD data of the dressed human body are calculated with a graph-cut (Graph-cuts) algorithm in an interactive propagation mode, human body point clouds are clipped using the binary images in the garment area, to obtain garment point clouds. A skeleton tracking API provided by Kinect SDK can achieve calculation of human skeleton information in RGBD data of the dressed human body, to obtain human skeleton data containing information of multiple skeleton key points, and thereby obtain three-dimensional posture data of the human body.

The three-dimensional garment component models in the three-dimensional garment component model library are all obtained by a standard virtual mannequin shown in FIG. 2. Accordingly, spatial scale, posture, location, orientation and the like of each three-dimensional garment component model can be adjusted according to correspondence between three-dimensional posture data of the human body and the standard virtual mannequin, the three-dimensional garment component model retrieved in the three-dimensional garment component model library can be registered to garment point clouds using a non-rigid deformation algorithm, particularly, the registration process is restrained by location priori information of the three-dimensional garment component model relative to the standard virtual mannequin, to achieve a better registration effect, so that the final three-dimensional garment model can fit the garment point cloud.

It should be noted that, the three-dimensional component models retrieved in the three-dimensional garment component model library may be not unique according to attribute information of each garment component, the retrieval result may be further optimized by a Bayesian network model based on a genetic algorithm, that is, the three-dimensional component models corresponding to attribute information of each garment component are further screened. Further, a degree of fitting between the three-dimensional garment component model and garment point cloud is evaluated using a spatial distance field, a fitting score of the registered candidate three-dimensional component model and garment point cloud is calculated, and scores of candidate three-dimensional component models are ranked from high to low according to the fitting score, to obtain an optimal three-dimensional garment component set. Then, meshes at stitching lines between three-dimensional component models are re-meshed through predefined stitching point pairs between three-dimensional component models, stitching relationship is constructed on the basis of a uniform mesh topology structure at the stitching edges of components; meshes of the individual three-dimensional garment component models are stitched together using a component shape-preserving stitching method, and initial shape features of each three-dimensional garment component model are maintained as much as possible.

Obviously, in a flow chart (not shown) of the method for generating a three-dimensional garment model according to the present invention, on the basis of the embodiments shown in FIG. 1, after S50, the method can further include steps as follows: acquiring a three-dimensional posture and a garment point cloud of the human body according to the RGBD data of the dressed human body; adjusting the three-dimensional garment model according to three-dimensional posture of the human body, so that the adjusted three-dimensional garment model can fit the garment point cloud.

In the embodiments of the present invention, RGBD data of the dressed human body acquired by a depth camera is taken as an input, in combination with an interactively extracted garment contour and distribution priori of the garment component model relative to the human skeleton, a garment component detector is used to calculate candidate garment component and its candidate location in the RGBD data; a garment component attribute classifier is used to calculate an attribute probability distribution of the candidate garment component on the candidate location; based on this, a Bayesian network based on a genetic algorithm is used to infer and parse optimal garment component composition and an attribute value. According to the inferring and parsing result, select a candidate three-dimensional component model from the three-dimensional garment component model library, according to correspondence between three-dimensional posture data of the human body and the standard virtual mannequin, the candidate three-dimensional component model is registered to garment point clouds with a non-rigid deformation algorithm, the registration process is restrained by location priori information of the three-dimensional garment component relative to the standard mannequin, to achieve a better registration effect. A degree of fitting between the three-dimensional component models is calculated, and an optimal three-dimensional garment component model is selected in combination with a garment structure and a parsing result of the component. The three-dimensional garment component models are automatically spliced using a shape-preserving stitching method, to obtain a three-dimensional garment model having attribute information of each garment component.

Figure 5:
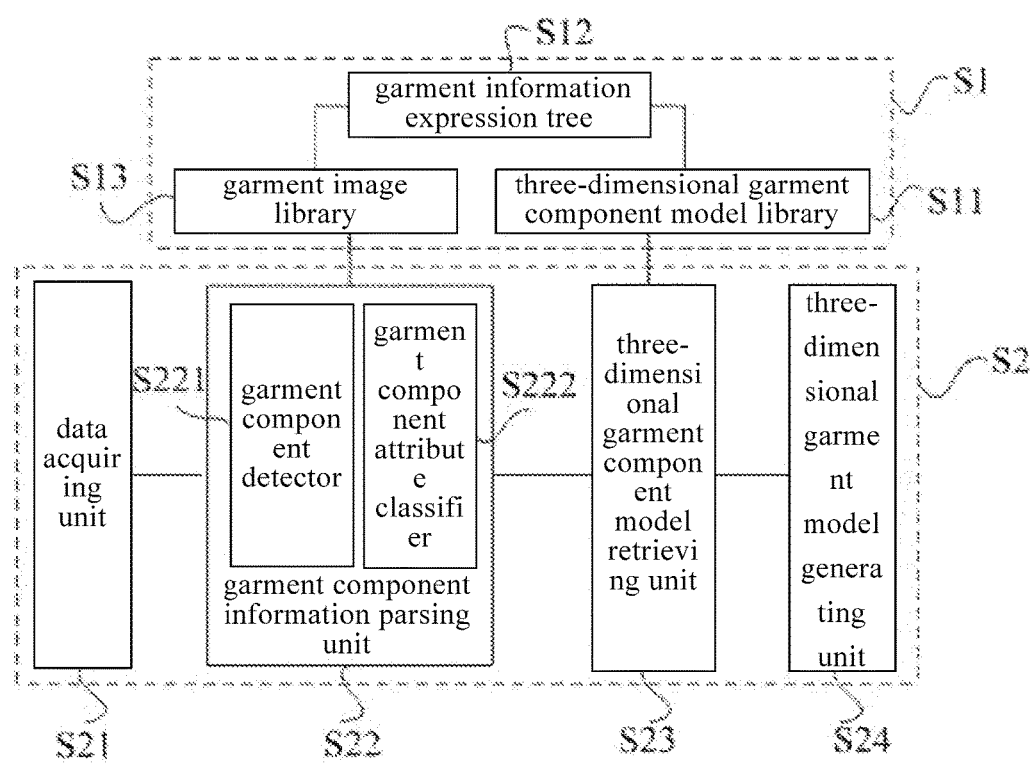
FIG. 5 is a schematic diagram of a system for generating a three-dimensional garment model according to an embodiment of the present invention.

FIG. 5 is a schematic diagram of a system for generating a three-dimensional garment model according to an embodiment of the present invention, the system can implement the method for generating a three-dimensional garment model according to the embodiments shown in FIG. 1, and no further details will be repeated here.

As shown in FIG. 5, the system for generating a three-dimensional garment model provided in this embodiment includes a system back-end S1 and a system front-end S2. Particularly, the system back-end S1 includes a three-dimensional garment component model library S11, the system front-end S2 includes a data acquiring unit S21, a garment component information parsing unit S22, a three-dimensional garment component model retrieving unit S23 and a three-dimensional garment model generating unit S24. The data acquiring unit S21 is configured to acquire RGBD data of a dressed human body. The garment component information parsing unit S22 particularly includes a garment component detector S221, configured to acquire garment component composition information according to the RGBD data of the dressed human body; and a garment component attribute classifier S222, configured to acquire attribute information of each garment component based on the garment component composition information; the three-dimensional garment component model retrieving unit S23 is configured to retrieve a three-dimensional garment component model corresponding to the attribute information of each garment component in a three-dimensional garment component model library; and the three-dimensional garment model generating unit S24 is configured to generate a three-dimensional garment model by assembling the three-dimensional garment component model.

As a preferred embodiment, the back-end of the system for generating a three-dimensional garment model further includes a garment information expression tree S12 and a garment image library S13. The garment information expression tree S12 can provide a global consistent garment component composition information and attribute information of each garment component for the whole system, the garment information expression tree S12 can be a tree table containing garment component composition information, attribute information of each garment component and a three-layer node state value corresponding to each attribute. The garment image library S12 includes a garment image with a garment component pixel area identifier and a corresponding component information identifier added according to the garment information expression tree S12. Based on this, the garment component detector S221 particularly can be configured to determine a pixel area of each garment component according to the RGBD data of the dressed human body, and then acquire component information corresponding to the pixel area in the garment image library S13, according to the pixel area of each garment component.

Further, the garment image in the garment image library S13 is also added with HOG feature and LBP feature identifiers in a pixel area of a garment component and a corresponding attribute information identifier according to the garment information expression tree S12, based on this, the garment component attribute classifier S222 particularly can be configured to extract an HOG feature and an LBP feature in the pixel area of each garment component, and acquire attribute information of corresponding component in the garment image library S13, according to the HOG feature and the LBP feature in the pixel area of each garment component.

Illustratively, the data acquiring unit S21 particularly can include a depth camera, such as Kinect, developed by the Microsoft Corporation. The garment component detector S221 particularly can be trained with the garment image library by a machine learning method. The garment component attribute classifier S222 particularly also can be trained with the garment image library by a machine learning method.

The system for generating a three-dimensional garment model in this embodiment can implement the method for generating a three-dimensional garment model according to the embodiments shown in FIG. 1, the implementation principle and technical effect are similar, and no further details will be repeated here.

Figure 6:
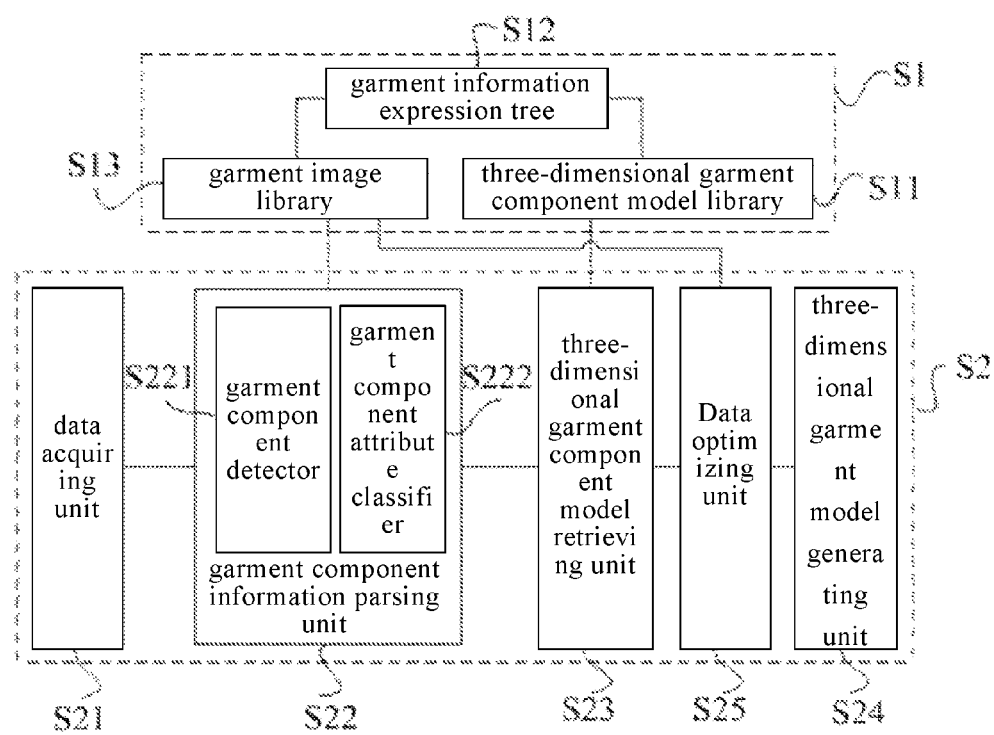
FIG. 6 is a schematic diagram of another system for generating a three-dimensional garment model according to an embodiment of the present invention.

FIG. 6 is a schematic diagram of another system for generating a three-dimensional garment model according to an embodiment of the present invention, as shown in FIG. 6, on the basis of the embodiments shown in FIG. 5, the system front-end further can include a data optimizing unit S25, the data optimizing unit S25 particularly can include a Bayesian network model obtained by training collocation constraint of each garment component, and the attribute information of each garment component acquired by the garment component information parsing unit S22 can be optimized by the Bayesian network model. Optionally, the Bayesian network model can be obtained by training garment images in the garment image library S13.

The system for generating a three-dimensional garment model in this embodiment can implement the method for generating a three-dimensional garment model according to the embodiments shown in FIG. 1 and FIG. 3, the implementation principle and technical effect are similar, and no further details will be repeated here.

Figure 7:
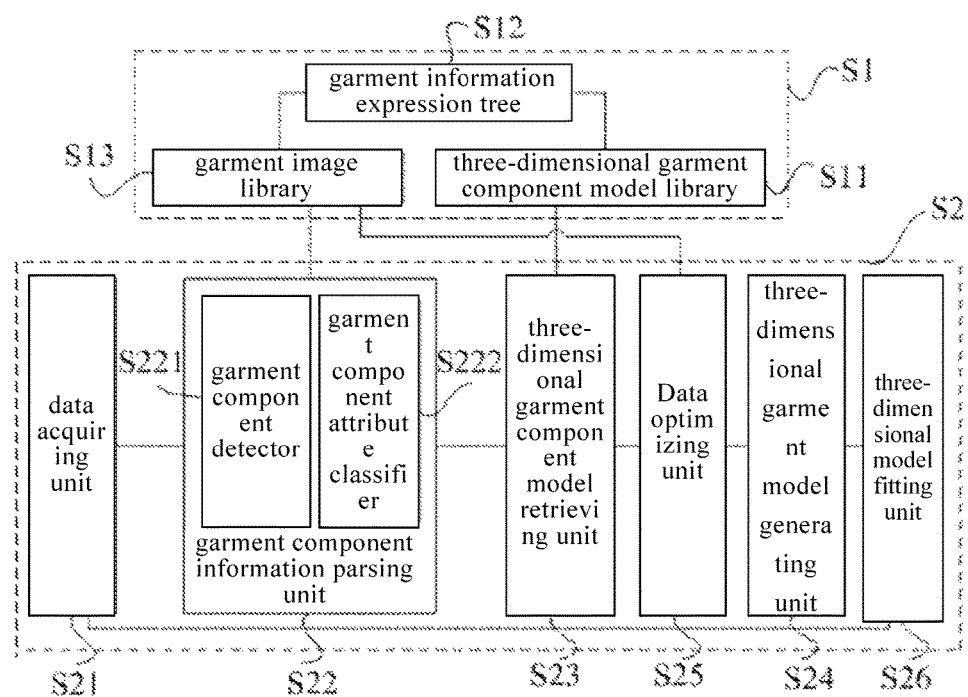
FIG. 7 is a schematic diagram of still another system for generating a three-dimensional garment model according to an embodiment of the present invention.

FIG. 7 is a schematic diagram of still another system for generating a three-dimensional garment model according to an embodiment of the present invention, as shown in FIG. 7, on the basis of the embodiments shown in FIG. 6, the system for generating a three-dimensional garment model in this embodiment further can include a three-dimensional model fitting unit S26, particularly configured to acquire a three-dimensional posture and a garment point cloud of the human body according to the RGBD data of the dressed human body; adjust the three-dimensional garment model according to three-dimensional posture of the human body generated by the three-dimensional garment model generating unit S24, so that the adjusted three-dimensional garment model can fit the garment point cloud.

The system for generating a three-dimensional garment model in this embodiment can implement the method for generating a three-dimensional garment model according to the embodiments shown in FIG. 1 and FIG. 4, the implementation principle and technical effect are similar, and no further details will be repeated here.

Obviously, in a schematic diagram (not shown) of the system for generating a three-dimensional garment model according to the present invention, on the basis of the embodiments shown in FIG. 5, the system further can include a three-dimensional model fitting unit, configured to acquire a three-dimensional posture and a garment point cloud of the human body according to the RGBD data of the dressed human body; adjust the three-dimensional garment model according to three-dimensional posture of the human body generated by the three-dimensional garment model generating unit, so that the adjusted three-dimensional garment model can fit the garment point cloud.

As will be appreciated by persons skilled in the art, all or partial steps of the above method embodiments can be implemented in a program instruction related hardware. The program can be stored in a computer readable medium. When the program is executed, the steps in the above method embodiments are performed; the storage medium includes various media capable of storing program codes, such as a read only memory (ROM), a random access memory (RAM), a floppy disk, or an optical disk and the like.

Finally, it should be noted that the above embodiments are merely provided for describing the technical solutions of the present invention, but not intended to limit the present invention. It should be understood by persons skilled in the art that although the present invention has been described in detail with reference to the foregoing embodiments, modifications can be made to the technical solutions described in the foregoing embodiments, or equivalent replacements can be made to partial or all technical features in the technical solutions; however, such modifications or replacements do not cause the essence of corresponding technical solutions to depart from the scope of the embodiments of the present invention.

What is claimed is:

1. A method for generating a three-dimensional garment model, comprising:

acquiring Red Green Blue and Depth (RGBD) data of a dressed human body;

constructing a garment information expression tree, wherein the information expression tree comprises a tree table containing garment component composition information and attribute information of each garment component;

constructing a garment image library, wherein the garment image library comprises garment images having a garment component pixel area identifier and a corresponding component composition information identifier, and wherein garment images in the garment image library further comprise Histogram of Oriented Gradient (HOG) feature and local binary pattern (LBP) feature identifiers in a pixel area of a garment component and an attribute information identifier of the corresponding component, wherein the constructing the garment image library particularly comprises: according to the garment information expression tree, adding the garment component pixel area identifier and the corresponding component information identifier and HOG feature and LBP feature identifiers in the pixel area of the garment component and a corresponding attribute information identifier for garment images in the garment image library;

acquiring garment component composition information according to the RGBD data of the dressed human body, wherein the acquiring garment component composition information according to the RGBD data of the dressed human body particularly comprises: determining a pixel area of each garment component according to the RGBD data of the dressed human body; acquiring component information corresponding to the pixel area in the garment image library, according to the pixel area of each garment component;

acquiring attribute information of each garment component based on the garment component composition information, wherein the acquiring attribute information of each garment component based on the garment component composition information particularly comprises: extracting an HOG feature and an LBP feature in the pixel area of each garment component; acquiring attribute information of corresponding component in the garment image library, according to the HOG feature and the LBP feature in the pixel area of each garment component;

constructing a three-dimensional model library of the garment component, wherein the three-dimensional model library of the garment component comprises a three-dimensional garment component model with an attribute information identifier of the garment component, wherein the constructing the three-dimensional model library of the garment component particularly comprises: according to the garment information expression tree, adding an attribute information identifier of the garment component for the three-dimensional garment component model in the three-dimensional model library of the garment component;

retrieving a three-dimensional garment component model corresponding to the attribute information of each garment component in a three-dimensional garment component model library; and generating a three-dimensional garment model by assembling the three-dimensional garment component model.

2. The method according to claim 1, wherein, after acquiring attribute information of each garment component, the method further comprises:

optimizing by inputting the attribute information of each garment component in a Bayesian network model, wherein the Bayesian network model is obtained by training garment images in the garment image library.

3. The method according to claim 1, wherein, after generating the three-dimensional garment model by assembling the three-dimensional garment component model, the method further comprises acquiring a three-dimensional posture and a garment point cloud of the human body according to the RGBD data of the dressed human body;

adjusting the three-dimensional garment model according to three-dimensional posture of the human body, so that the adjusted three-dimensional garment model can fit the garment point cloud.

4. A system for generating a three-dimensional garment model comprising a memory, a three-dimensional garment component model library, a garment component detector, a garment component attribute classifier, a garment information expression tree, a garment image library and a processor, wherein the memory is configured to store instructions, the processor is coupled with the memory and is configured to execute the instructions stored on the memory, and the processor is configured to:

acquire Red Green Blue and Depth (RGBD) data of a dressed human body;

wherein the garment component detector is configured to acquire garment component composition information according to the RGBD data of the dressed human body; and the garment component attribute classifier is configured to acquire attribute information of each garment component based on the garment component composition information;

wherein the processor is further configured to: retrieve a three-dimensional garment component model corresponding to the attribute information of each garment component in a three-dimensional garment component model library; and generate a three-dimensional garment model by assembling the three-dimensional garment component model;

the garment information expression tree is a tree table containing garment component composition information and attribute information of each garment component;

the garment image library comprises garment images having a garment component pixel area identifier and a corresponding component information identifier, and Histogram of Oriented Gradient (HOG) feature and local binary pattern (LBP) feature identifiers in the pixel area of the garment component and a corresponding attribute information identifier, wherein, the garment component pixel area identifier and the corresponding component information identifier, and HOG feature and LBP feature identifiers in the pixel area of the garment component and the corresponding attribute information identifier are all added according to the garment information expression tree;

the garment component detector is specifically configured to determine a pixel area of each garment component according to the RGBD data of the dressed human body, and acquire component information corresponding to the pixel area in the garment image library, according to the pixel area of each garment component; wherein, the garment component detector is obtained by training garment images in the garment image library;

the garment component attribute classifier is specifically configured to extract an HOG feature and an LBP feature in the pixel area of each garment component, and acquire attribute information of corresponding garment component in the garment image library, according to the HOG feature and the LBP feature in the pixel area of each garment component; wherein, the garment component attribute classifier is obtained by training garment images in the garment image library;

the three-dimensional model library of the garment component comprises a three-dimensional garment component model with an attribute information identifier of the garment component, and the attribute information identifier of the garment component is added according to the garment information expression tree.

5. The system according to claim 4, further comprises a Bayesian network model obtained by training garment images in the garment image library, and is configured to optimize attribute information of each garment component; and the processor is further configured to acquire a three-dimensional posture and a garment point cloud of the human body according to the RGBD data of the dressed human body; adjust the three-dimensional garment model according to three-dimensional posture of the human body, so that the adjusted three-dimensional garment model can fit the garment point cloud.

* * * * *